(12) United States Patent
Sutto

(10) Patent No.: US 8,785,055 B2
(45) Date of Patent: Jul. 22, 2014

(54) IONIC LIQUID BATTERIES

(75) Inventor: Thomas E. Sutto, Woodbridge, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 474 days.

(21) Appl. No.: 12/924,033

(22) Filed: Sep. 7, 2010

(65) Prior Publication Data

US 2013/0344399 A1    Dec. 26, 2013

Related U.S. Application Data

(60) Provisional application No. 61/277,186, filed on Sep. 14, 2009.

(51) Int. Cl.
  *H01M 10/056* (2010.01)

(52) U.S. Cl.
  USPC .......... 429/328; 429/188; 429/336; 429/339; 429/344; 429/345

(58) Field of Classification Search
  IPC .............. H01M 4/02, 4/32, 4/34, 4/42, 4/46, H01M 4/463, 4/466, 4/52, 4/523, 4/56, 10/05, H01M 10/054, 10/0564
  See application file for complete search history.

(56) References Cited

U.S. PATENT DOCUMENTS

| | | | |
|---|---|---|---|
| 4,234,667 A | 11/1980 | Bennion et al. | 429/81 |
| 4,740,437 A * | 4/1988 | Fujii et al. | 429/213 |
| 5,589,291 A | 12/1996 | Carlin et al. | 429/103 |
| 5,827,602 A | 10/1998 | Koch et al. | 429/194 |
| 7,316,866 B2 | 1/2008 | Yong et al. | 429/231.1 |
| 7,419,744 B2 | 9/2008 | Kishi et al. | 429/218.1 |
| 7,479,353 B2 | 1/2009 | Hollenkamp et al. | 429/324 |
| 2004/0185331 A1* | 9/2004 | Saruwatari et al. | 429/86 |
| 2006/0204855 A1* | 9/2006 | Saruwatari et al. | 429/324 |

OTHER PUBLICATIONS

T. E. Sutto, "The Electrochemical Behavior of Trialkylimidazolium Imide Based Ionic Liquids and Their Polymer Gel Electrolytes", *J. Electrochem. Soc.* 154 (2007), (11), 130-135.

M. P. Stracke et al., "Imidazolium ionic liquids as electrolytes for manganese dioxide free Leclanché Batteries", *Applied Energy*, 86 (2009), 1512-16.

D. Appleby et al., "Room-temperature ionic liquids as solvents for electronic absorption spectroscopy of halide complexes", *Nature* 323 (1986), 614-16.

PHYSorg.com, "Scientists demonstrate novel ionic liquid batteries", Apr. 2011. http://www.phys.org/pdf222077328.pdf.

S. Ketabi et al., "EMIHSO$_4$-Based Polymer Ionic Liquid Electrolyte for Electrochemical Capacitors", *Electrochemical. & Solid-State Letters*, 15 (2), A19-A22 (2012). http://esl.ccadl.org/content/15/2/A19.full.pdf.

* cited by examiner

*Primary Examiner* — Alix Echelmeyer

(74) *Attorney, Agent, or Firm* — Gerhard W. Thielman, Esq; Oscar A. Towler, III Esq

(57) ABSTRACT

Novel electric battery systems are disclosed utilizing selected ionic liquids as electrolytes and selected metals and metal oxides as electrodes. The ionic liquids utilize a substituted imidazolium cation, which does not have the corrosive safety and environmental concerns associated with corrosive acid and alkali electrolytes.

6 Claims, 1 Drawing Sheet

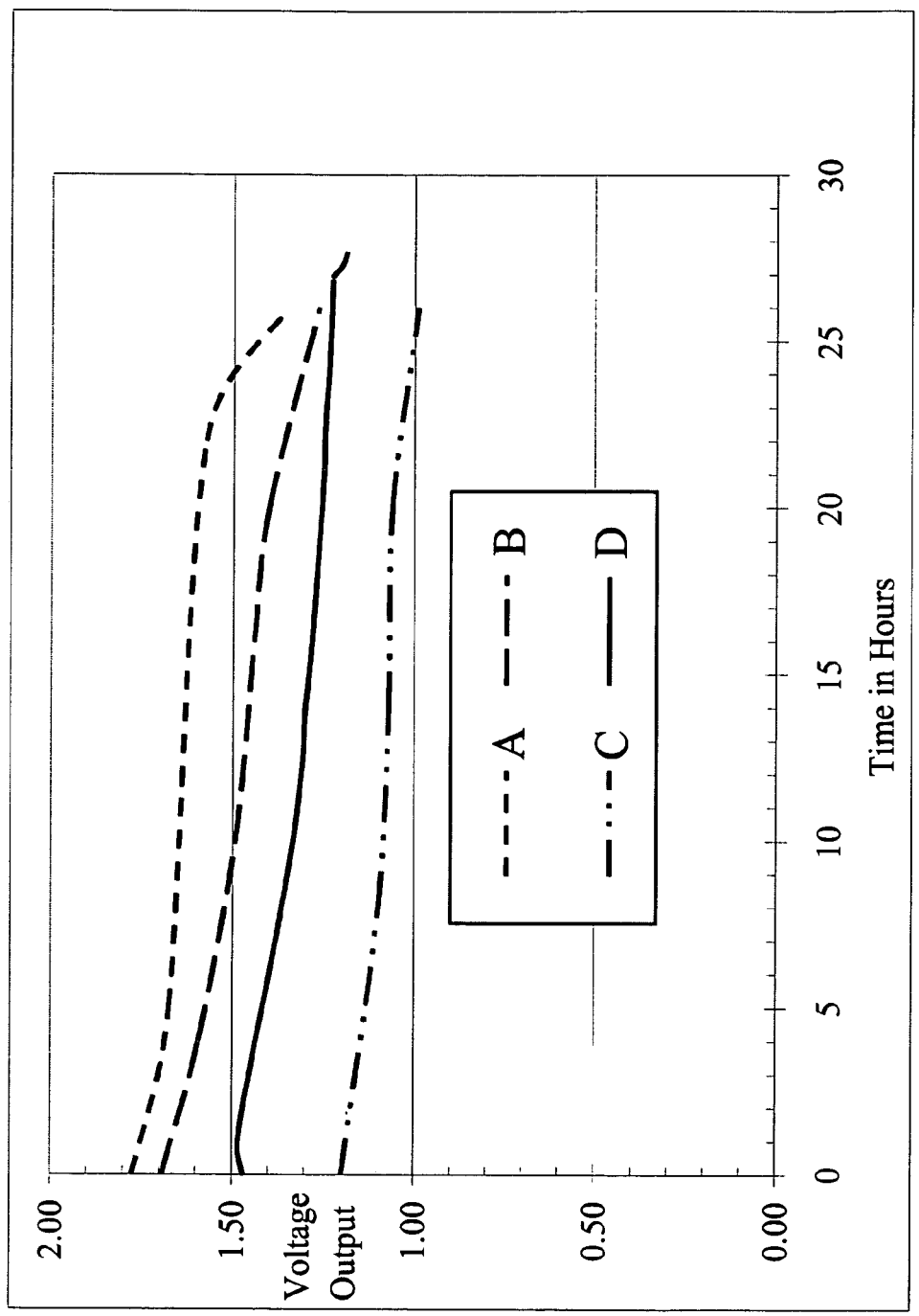

IONIC LIQUID BATTERIES

CROSS REFERENCE TO RELATED APPLICATION

This application claims priority to and incorporates by reference the entirety of U.S. Provisional Patent Application No. 61/277,186 filed Sep. 14, 2009, entitled "Ionic Liquid Batteries."

STATEMENT OF GOVERNMENT INTEREST

The invention described herein was made in the performance of official duties by one or more employees of the Department of the Navy and therefore the invention disclosed herein may be manufactured, used, or licensed by or for the Government of the United States for governmental purposes without the payment of any royalties thereon or therefor.

FIELD OF THE INVENTION

This invention relates to batteries, and more specifically to batteries having electrodes comprising defined constituents and an electrolyte comprising an ionic liquid. In one embodiment of the current invention, the electrolyte comprises an ionic liquid having an imidazolium cation paired with a reactive anion.

BACKGROUND

Modem battery usage consists of an interesting mix of old technology such as the well-known lead-acid batteries and newer technology such as batteries using various polymer combinations as electrolytes. Most automotive batteries, for example, are still lead-acid types, while lighter-weight batteries typically used for smaller devices such as cell phones use different materials such as nickel-cadmium and/or lithium materials.

The drawbacks associated with batteries that use acids or alkalis as electrolytes have been repeatedly characterized in the relevant literature. These drawbacks include the health, safety, and environmental concerns associated with highly corrosive acid and alkali electrolytes, the disadvantages of using heavier, environmentally-unfriendly metals such as lead for electrodes, and the relatively high weight-to-power ratios of such batteries. While these types of batteries continue to be widely employed, efforts have been made to find alternative electrolyte and electrode materials that are less hazardous. Some of these alternative technologies are described as follows.

In regard to all of the below-described prior art involving the use of ionic liquids, the ionic liquids are used as non-flammable, non-reactive solvent systems. The unique aspect of the battery systems described by this new approach is to create an ionic liquid which is itself a reactive component of the battery system. This introduces a new type of chemistry other than that described in the prior art discussion. In these new systems, the ionic liquid functions not only as the solvent, but as an integral part of the electrochemical processes used to generate electric current from the battery.

Bennion et al. (U.S. Pat. No. 4,234,667) describe and claim a battery comprising a positive electrode, a molten lithium chlorate and/or lithium perchlorate electrolyte, and a negative electrode comprising elementary lithium. While this may exhibit advantages over the use of strong, corrosive acid or alkali electrolytes, the lithium chlorate/perchlorate electrolyte requires an operating temperature range of about 140° C.-160° C. This is not acceptable for many uses, especially for smaller devices such as hearing aids. Also, while lithium is perhaps less environmentally damaging than lead, it is still a concern.

Carlin et al. (U.S. Pat. No. 5,589,291) disclose a battery comprising a lithium metal anode with a lithium salt protective film deposited on the anode, and an electrolyte comprising a molten salt electrolyte (MSE). The MSE can comprise 1-ethyl-3-methylimidazolium and must also contain $LiBF_4$ and water.

Koch et al. (U.S. Pat. No. 5,827,602) disclose a range of ionic liquid cations for a variety of uses. One of the cations is imidazolium as described in Koch et al. at col. 2, line 63, through col. 3, line 7. While Koch et al. disclose that such an ionic liquid can be used as an electrolyte, they specify that such use requires the presence of $Li^+$ in the electrolyte for use in primary or secondary lithium batteries.

Yong et al. (U.S. Pat. No. 7,316,866) disclose a battery cathode produced from a slurry, the slurry comprising a lithium-containing metal composite oxide (e.g., $LiCoO_2$) or a chalcogenide and an ionic liquid. The ionic liquid can be any conventional ionic liquid, including one in which the cation is imidazolium. The slurry is applied to a current collector, with or without a binder, and dried to form the cathode. With respect to the current invention, it is particularly noted that Yong et al. do not disclose an electrolyte comprising an ionic liquid containing imidazolium cation, but instead (see Yong et al., col. 6, ll. 41-55) specify an electrolyte solution comprising salts, e.g., $Li^+$, $Na^+$, and/or $K^+$ with an anion.

Kishi et al. (U.S. Pat. No. 7,419,744) disclose and claim a secondary battery having a specified anode, a cathode, and a nonaqueous electrolyte consisting of a lithium salt, an ionic liquid, and a specified ally phosphate. The ionic liquid may comprise an imidazolium cation.

Hollenkamp et al. (U.S. Pat. No. 7,479,353) disclose the use of an ionic liquid as an electrolyte. The cation of the ionic liquid is a pyrrolidinium compound. It is further specified (see claim 1) that the ionic liquid electrolyte must contain lithium ions.

SUMMARY OF THE INVENTION

Various exemplary provide for the discovery and use as an electrolyte a substituted imidazolium cation.

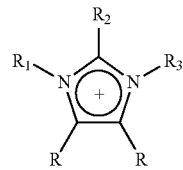

This cation is wherein each R independently is H (hydrogen) or a halogen; $R_1$ and $R_2$ independently are H, a halogen, or $CH_3$; and $R_3$ is an aliphatic moiety of formula $C_nA_m$ with $n \geq 1$ and $m \geq n$, and where each A independently is H or a halogen, and wherein "halogen" as used throughout includes any of the Group 17 (IUPAC designation) elements.

The described ionic liquid electrolyte preferably has as an anion a mineral acid such as the nitrate or hydrogen sulfates. The anode for use in the battery is zinc or lead, and the cathode is a metal oxide.

The disclosed battery does not require the use of highly corrosive acids or alkalis as an electrolyte and does not require the presence of lithium. The constituents of the battery are relatively inert and non-toxic.

BRIEF DESCRIPTION OF THE DRAWING

These and various other features and aspects of various exemplary embodiments will be readily understood with reference to the following detailed description taken in conjunction with the accompanying drawing, in which:

FIG. is a graphical view of voltage as a function of time.

DETAILED DESCRIPTION OF THE INVENTION

As noted above, many batteries in wide use require as electrolytes strong acids or alkalis. These pose safety risks in that they are highly corrosive, and they are also environmentally harmful. Other batteries, while perhaps less harmful to safety and the environment, require the use of alkali metals such as lithium. While perhaps less environmentally unfriendly than large amounts of lead, these substances can pose a risk and are difficult to recycle. It is thus desired to create batteries that utilize smaller amounts of, or no, substances that are environmentally harmful and pose little or no health risks.

A battery according to the current invention utilizes an electrolyte comprising an ionic liquid. In contrast to the acids or bases used as electrolytes in other batteries, ionic liquids as used herein are salts with organic components and are liquids at temperatures well below 100° C. They are highly stable, with almost no vapor pressure and are thus non-volatile. The presence of the cation tends to give ionic liquids high ionic conductivity, making them excellent replacements for other types of battery electrolytes.

The current invention is based on a finding that an ionic liquid having an asymmetrically substituted imidazoium cation can serve as an electrolyte and provide an electrical potential similar to that of alkaline batteries. For such use, the anion of the ionic liquid is preferably a mineral acid anion, and more preferably is nitrate $NO_3^-$ or hydrogen, sulfate $HSO_4^-$. Other anions can be used, however, such as dihydrogen phosphate $H_2PO_4^-$ or magnesium phosphate $Mq(H_2PO_4)$.

When the described cation is used in an ionic liquid with a mineral acid anion, it was observed that zinc metal in the presence of hydrogen sulfate would react to form zinc sulfate at a potential of about 0.8 volts. As noted, this is similar to the potential exhibited by a zinc anode in a standard alkaline cell. Various anodes of zinc, aluminum, manganese, and lead were tested against metal oxide cathodes, and the results are shown in Table 1 below.

TABLE 1

List of Cathode/Ionic Liquid/Anode Cells and Their Original Discharge Voltages

| Cathode Material | Anode Material | Ionic Liquid | Voltage Output |
|---|---|---|---|
| $MnO_2$ | Zn | $EMIHSO_4$ | 1.71 |
| $MnO_2$ | Zn | $MMBINO_3$ | 1.69 |
| $MnO_2$ | Pb | $EMIHSO_4$ | 0.70 |
| $MnO_2$ | Al | $EMIHSO_4$ | 1.15 |
| $MnO_2$ | Mn | $EMIHSO_4$ | 1.10 |
| $PbO_2$ | Zn | $EMIHSO_4$ | 1.80 |
| $PbO_2$ | Pb | $EMIHSO_4$ | 0.80 |
| $PbO_2$ | Al | $EMIHSO_4$ | 1.70 |
| $PbO_2$ | Mn | $EMIHSO_4$ | 0.90 |
| NiO | Zn | $EMIHSO_4$ | 1.58 |

TABLE 1-continued

List of Cathode/Ionic Liquid/Anode Cells and Their Original Discharge Voltages

| Cathode Material | Anode Material | Ionic Liquid | Voltage Output |
|---|---|---|---|
| NiO | Pb | $EMIHSO_4$ | 1.19 |
| NiO | Al | $EMIHSO_4$ | 1.12 |
| $Ag_2O$ | Zn | $EMIHSO_4$ | 1.20 |

The ionic liquids used in Table 1 are 1-ethyl-3-methyl imidazolium hydrogen sulfate ($EMIHSO_4$) and 1,2-dimethyl-3-butyl imidazolium nitrate ($MMBINO_3$). Because the $MnO_2/Zn/EMIHSO_4$, $MnO_2/Zn/MMBINO_3$, and $PbO_2/Zn/EMIHSO_4$ systems provide the highest output of those tested (i.e., 1.71, 1.69, and 1.80 volts, respectively) these are the preferred embodiments of the current invention, but the invention is not limited to these.

To test discharge profiles, four battery systems were assembled and tested. These systems consisted of small solid state cells measuring approximately 1 cm. in diameter and approximately 0.3 cm. in height. Polyvinyl alcohol (PVA) was added to the electrolyte of certain of these systems. The PVA serves to form a solid or almost solid gel, which provides a physically more stable electrolyte. The discharge profiles are shown in the FIG.

The lettered lines represent the following systems: A—$PbO_2$ cathode vs. Zn anode in $EMIHSO_4$-PVA; B—$MnO_2$ cathode vs. Zn anode in $EMIHSO_4$-PVA; C—$Ag_2O$ cathode vs. Zn anode using $EMIHSO_4$-PVA; and D—$MnO_2$ cathode vs. Zn anode in $MMBINO_3$ (liquid). The cells were subjected to a steady discharge rate of 0.5 mA/cm². For each of these, the voltage slowly declined for just over 24 hours, which is approximately the same as is observed in standard alkaline cells of similar characteristics.

Because self-discharge or shelf-life is a concern with batteries, another test was conducted. A solid state cell was constructed having the $EMIHSO_4$-PVA electrolyte, an $MnO_2$ cathode, and a zinc (Zn) anode. After assembly, the cell was not discharged, but instead the voltage was measured periodically over a period of seven (7) days. During the first approximately 24 hours, the discharge voltage dropped from about 1.71 volts to about 1.50 volts. The voltage thereafter remained steady for the next six (6) days. Discharge tests indicated that the capacity of the cell (based on the weight of the cathode used), was approximately 180 mAH/kg. This is very similar to that observed for standard alkaline batteries, which have capacities of about 170-190 mAH/kg.

A third test was also conducted. Two cells were assembled, each having a $PbO_2$ cathode, a zinc anode, and an electrolyte comprising $EMIHSO_4$-PVA. These two cells, which as shown above each separately provide about 1.80 volts, were linked in series and found to create a 3.6 V/10 mA power source, sufficient to power a relatively large LED.

While not considered necessary to enablement of the current invention, the electrochemical half cell reactions are as follows, with M representing manganese or lead:

$$M^{+4}O^{-2}{}_2 + 2HSO_4^- + 2e^- \rightarrow M^{+2}(OH^-)_2 + 2SO_4^{-2}$$

and $$Zn^0 + SO_4^{-2} \rightarrow Zn^{+2}SO_4^{-2} + 2e^-,$$

which combine to give the overall chemical reaction of:

$$M^{+4}O^{-2}{}_2 + 2HSO_4^- + 2Zn^0 \rightarrow M^{+2}(OH^-)_2 + 2Zn^{+2}SO_4^{-2} + 2e^-.$$

The various cells described above were constructed as follows. A liquid cell was created using a zinc strip as the anode. The cathode was made by coating a gold metal strip with a thin polymer coating, the coating being composed of about 70 wt % $MnO_2$, about 5 wt % graphite, and about 15 wt % polyvinylidenefluoro-co-hexafluoropropylene (PVdF-HFP). The electrolyte was $EMIHSO_4$. Discharging was conducted at a rate of 0.01 mA for a cathode mass of 0.011 gram.

The solid state cells utilized pre-cast films of the different metal oxides and ionic liquids. The cathodes were drop cast from a solution of about 70 wt % metal oxide, about 5 wt % graphite and about 15 wt % PVDF-HFP to form a 5 cm diameter polymer composite approximately 3 mm thick. For each individual test, a 1 cm diameter disc was cut from the composite. The electrolyte for these cells was composed of about 85 wt % ionic liquid and 15 wt % PVA. This mixture was drop cast to form a 5 cm disc approximately 2 mm thick. This was cut into discs slightly larger than 1 cm diameter (to avoid shorting during the tests). The anodes were 1 cm discs cut from pure metal foil, and solid state testing was accomplished using a Maccor battery test station 4304.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A lithium-free battery consisting essentially of:
   (a) an anode consisting essentially of one of zinc (Zn), manganese (Mn), aluminum (Al), and lead (Pb);
   (b) a cathode consisting essentially of a metal oxide selected from the group consisting of $MnO_2$, $PbO_2$, NiO, and $Ag_2O$; and
   (c) an ionic liquid electrolyte consisting essentially of an imidazolium cation as:

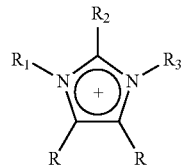

wherein each R independently is H or a halogen; $R_1$ and $R_2$ independently are one of hydrogen (H), a halogen, and $CH_3$; and $R_3$ is an aliphatic moiety of formula $C_nA_m$ with $n \geq 1$ and $m \geq n$, wherein each A independently is one of H and a halogen of Group 17 (IUPAC designation) elements, and wherein lithium (Li) is excluded among all of said anode, said cathode and said electrolyte.

2. The battery according to claim 1, wherein said ionic liquid further comprises an anion, said anion being a mineral acid anion.

3. The battery according to claim 2, wherein said anion is selected from the group consisting of hydrogen sulfate, nitrate, dihydrogen phosphate, and magnesium phosphate.

4. The battery according to claim 1, wherein said ionic liquid further comprises polyvinyl alcohol.

5. The battery according to claim 2, wherein said anode comprises zinc, said cathode comprises one of $PbO_2$ and $MnO_2$, and said anion comprises hydrogen sulfate.

6. The battery according to claim 5, wherein said cation is 1-ethyl-3-methyl imidazolium.

* * * * *